March 28, 1961 T. W. MILLER 2,976,997
MEANS FOR SEPARATING HEAVY PARTICLES FROM SANDS
Filed Oct. 8, 1957
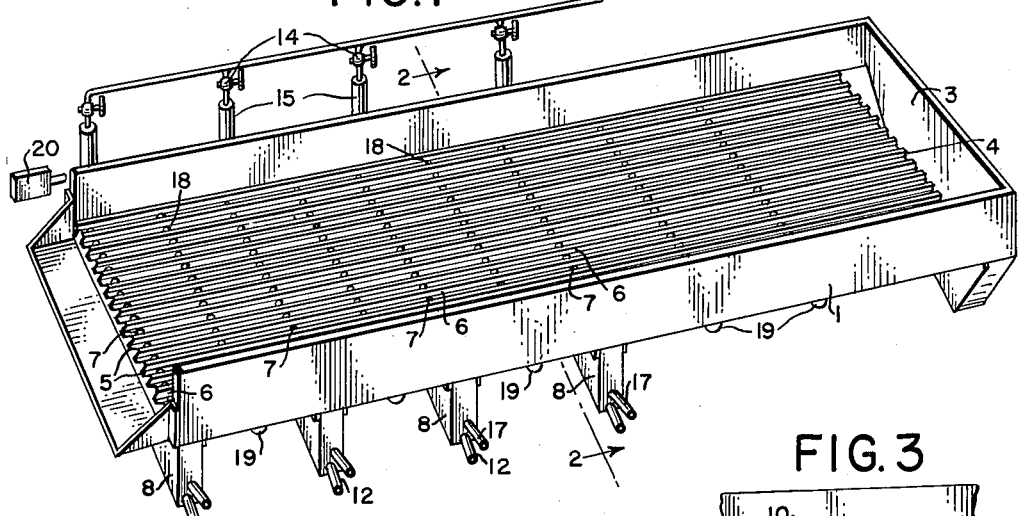
FIG.1
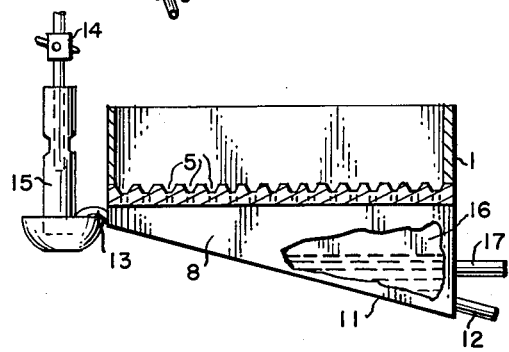
FIG.2
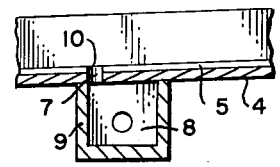
FIG.3
FIG.5
FIG.4
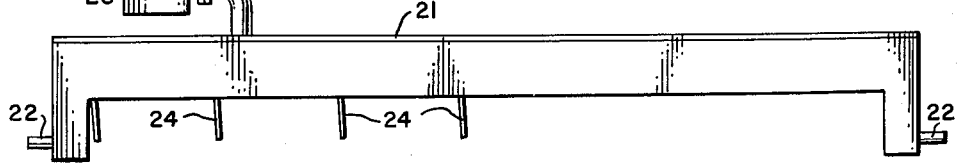
FIG.7
FIG.6
INVENTOR
TREVLYN W. MILLER
BY Watson, Cole, Grindle & Watson
ATTORNEYS

United States Patent Office 2,976,997
Patented Mar. 28, 1961

2,976,997
MEANS FOR SEPARATING HEAVY PARTICLES FROM SANDS

Trevlyn W. Miller, Cape Morgan, P.O. Kei Mouth, Union of South Africa

Filed Oct. 8, 1957, Ser. No. 688,923
Claims priority, application Union of South Africa Oct. 9, 1956
10 Claims. (Cl. 209—454)

This invention relates to a method and sluice box for separating the heavy from the lighter constituents of comminuted solids and also for effecting a size classification of the comminuted solid material.

The invention is applicable to the treatment of naturally occurring sands or those produced by the crushing and/or screening of ores or other solid materials to enable separate recovery of either the lighter or heavier constituents or both depending on the value of the same, and has for its object the provision of a method and means which will enable the more efficient recovery of such valuable constituents than can be obtained by the use of the known sluice or riffle boxes.

The method of effecting the separation of the constituents of comminuted solid material in accordance with this invention comprises the conveying of said material as a slurry down a sluice box and allowing constituents of the material to gravitate through an aperture or apertures through the floor of the sluice box while maintaining the outlet or outlets of said aperture or apertures at a gas pressure higher than the ambient pressure on the top of the slurry.

By the term "slurry" is meant solid particles mixed with sufficient liquid to enable the mixture to flow as a liquid, and the term "gas" in this specification and accompanying claims is to be construed as including air.

The means for effecting separation of said constituents comprises a sluice box having a discharge aperture or apertures through the floor thereof, and means for maintaining the outlet or outlets of said aperture or apertures at a gas pressure higher than the ambient pressure in the sluice box.

According to further features of the invention the floor of the sluice box is in the shape of adjacent channels extending parallel to the length of said floor; transverse rows of apertures extend through the bottom of the channels; the wall of each aperture extends downwardly as a continuation of the downstream side of the wall of the aperture and the latter opens into a compartment, said compartment positioned below the floor of the sluice box and adapted to contain gas or air at superatmospheric pressure.

Preferred forms of the apparatus for carrying out the invention are shown in the accompanying drawing in which:

Fig. 1 is a perspective view of the sluice box.
Fig. 2 is a cross section on the line 2—2, Fig. 1.
Figs. 3, 4, 5 and 6 are enlarged sections of details of the sluice box and,
Fig. 7 shows a modified form of sluice box.

In the drawing 1 represents a sluice box which is inclined lengthwise but is kept level transversely so that a smooth steady evenly distributed flow of slurry is maintained by gravity from the intake trough 3.

The first part of the floor 4 of the sluice 1 adjacent trough 3 may be left flat so that the slurry from trough 3 will run down said part as a fairly smooth sheet but, as shown, is usually provided with small closely adjacent channels 5 which may gradually increase in depth towards the discharge end of the sluice box. These channels 5 are parallel to one another and extend over the full width and full length of the floor 4 of the sluice box 1. At intervals 6 the floors of each channel 5 have apertures 7 through them, the diameters of said apertures 7 being substantially equal to the width of the channels 5 and the apertures 7 positioned in rows extending transversely across the floor 4.

Below each row of apertures 7 and attached to the under part of the floor 4 is a box adapted to contain air or gas under pressure. The inside surface 9 of the wall of each box 8 on the downstream side is in line with or is closely adjacent to the downstream walls 10 of each corresponding row of apertures 7 (see Fig. 3).

The floor 11 of each box 8 slopes downwardly towards an outlet 12 in the form of a liquid seal. The other side of each box 8 is fitted with a water inlet pipe 13. Preferably the water is aerated before it enters each box 8 by discharging a faucet 14 into an open and perforated pipe 15 which terminates in a water seal and is connected to pipe 13 so that the air entrained by the water escapes into space 16 of the box 8 and maintains a superatmospheric pressure therein. Under working conditions the pressure of the air is controlled so that it cannot blow out through apertures 7 against the pressure of the blanket of the slurry passing down the sluice 1. The quantity of water maintained in box 8 and therefore the pressure of air in space 16 is regulated by an overflow pipe 17 and may be varied in the different boxes 8. Should the quantity of water in box 8 fall below pipe 17 the pressure of air in space 16 is lowered and a greater quantity of air and water enters through pipe 13 and pipe 17 is again sealed. The size of pipe 12 is selected to suit the discharge occuring from the box 8.

In the operation of a sluice 1 according to the invention it is so arranged that for some little distance the slurry flows down the part of floor 4 adjacent trough 3 without any interruption due to the presence of apertures 7 in the small channels 5. During this first portion of the travel of the slurry even the small particles of the heavy constituents of the slurry tend to gravitate into the channels 5 and slowly move down them. These heavy particles gradually become separated from the general mass in the slurry and because of the small size of the channels remain separated and usually move down the sluice more slowly than the general mass of the slurry but eventually arrive at the brink of an aperture 7 frequently accompanied by a certain amount of physically entrained sand or other lighter material. Since each aperture 7 opens into a box 8 the air in the box 8 will tend to flow up out of the apertures 7 but is prevented from doing so by the blanket of slurry moving down the sluice box. The air pressure in boxes 8 is adjusted so that any free liquid tending to fall through the apertures 7 is partially suspended and the amount of liquid flowing through apertures 7 is substantially confined to that portion which is wetting the heavy particles, this liquid being drained away along the adjacent wetted surfaces 10 and 9 of the box 8, so that there is no excessive loss of liquid but sufficient to facilitate the passage of the heavy particles.

By adjustment of the air pressure as described above the liquid in the slurry appears to be partially suspended as bubbles at the apertures 7 said bubbles tending to prevent the lighter particles falling through the apertures 7 while the heavier particles pass over the bubbles to the downstream sides 10 of apertures 7 and then slide down the surface 10 and walls 9 into the bottom of boxes 8 from where they are withdrawn through outlet pipes 12. The effect is more marked the greater the proportion of heavy particles in the slurry and this enables an extremely effective separation to be obtained of constituents which vary only slightly in specific gravity provided there is not too great a variation in particle size. For example in separating the heavy constituents of illmenite sands it is found that the variation in particle size should not be greater than one to ten and the maximum particle size should not be greater than about one tenth the width of the channels 5. If the variation in particle size is greater than one to ten the sluice box 1 may be used initially as a size classifier the material being allowed to flow down the sluice box as a slurry when the average size of the particles discharging into the boxes 8 will increase towards the end of the sluice box 1. The fractions discharged through each box may then be separately retreated for the separation of the heavy constituents as described above. It will be clear that comminuted solids of substantially uniform composition and specific gravity may be similarly classified with regard to particle size.

It has been found that some heavy particles are liable to pack tightly in certain channels 5 particularly if they are very small due to the shape in cross section of the channels 5 tending to allow particles of a particular shape to assemble and form barriers across the width of the channel 5. Generally speaking a V shape channel 5 (Fig. 4) of about 30° angle gives the best all round results in preventing the formation of barriers in the channel but channels of U shape (Fig. 5) are also used effectively.

The slope of the floor 4 is varied to suit the material being treated and to assist in breaking up any barriers fresh water or air or both may be supplied through secondary apertures 18 connected to air or water supply conduits such as 19 (Fig. 6). These secondary apertures 18 are generally most useful when placed before the first line of apertures 7. The fluid in conduits 19 may be given a regular pulsation to inject it through the very small apertures 18 into the bottom of the channels 5. Generally however, the projection of fluids through apertures such as 18 is not required if a suitable shape of channel 5 is selected and the angle of the floor 4 suitably adjusted.

The packing of the particles may also be reduced by delivering a blow or a series of vibrations periodically to the sluice box 1 by a hammer 20 or other means at the end thereof. The opposite end of the box 1 may be suitably loaded to resist the blow from the hammer 20.

It is also found that with certain materials the efficiency of separation can be improved by the use of a wetting agent in the slurry, particularly one which will effect a preferential wetting of the heavier particles. Also the slurry may be treated with flotation agents to assist in the separation of certain constituents from those passing by gravity through apertures 7.

While the super-atmospheric pressure in the spaces 16 in boxes 8 acts to prevent the simultaneous discharge of water with the particles, a similar pressure difference and corresponding effect may be obtained by reducing the pressure above the slurry while leaving the discharge ends of the apertures 7 open to atmospheric pressure. In this case as shown in Fig. 7 the top portion of the sluice box 1 is closed by a sealed cover 21, the slurry entering and the overflow discharging through liquid seals 22 while a sub-atmospheric pressure is maintained above the slurry by a vacuum pump 23. The discharge from the rows of apertures 7 is directed by partitions 24 corresponding in position to the walls 9 of boxes 8 and thus forming in effect extensions of the downstream walls 10 of apertures 7. Where desired the rows of apertures may be replaced by a single aperture in the form of a transverse slot.

The invention is generally applicable to a large number of separating operations and where desirable liquids other than water may be used to form a slurry, and gases other than air used in the maintenance of a lower pressure above the slurry than exists in the vicinity of the outlet ends of the discharge apertures.

It is also possible to eliminate the boxes 8 or cover 21 so that the bottoms of the apertures 7 and the top surface of the slurry are under the same pressure. With such a sluice the shape and width of the channels and size of apertures is extremely critical and must be individually designed by empirical methods for each type of slurry treated. Such a construction is therefore not preferred since it is not as universally applicable as the embodiments of the invention illustrated and described above.

What I claim as new and desire to secure by Letters Patent is:

1. A sluice box comprising a floor, discharge apertures spaced at intervals along the length of said floor, means for maintaining the outlets of said apertures at a gas pressure higher than the ambient pressure in the upper part of the sluice box, said floor being in the shape of adjacent parallel channels extending parallel to the length of said floor and communicating with the apertures and the latter each having a diameter substantially equal to the width of the corresponding channel.

2. A sluice box as claimed in claim 1 in which the channels are V-shaped in cross section.

3. A sluice box as claimed in claim 1 in which the channels are U-shaped in cross section.

4. A sluice box as claimed in claim 1 in which the apertures are positioned in rows extending transversely across the floor of the sluice box.

5. A sluice box comprising a floor, discharge apertures spaced at intervals along the length of said floor, means for manitaining the outlets of said apertures at a gas pressure higher than the ambient pressure in the upper part of the sluice box, said floor being in the shape of adjacent parallel channels extending parallel to the length of said floor and communicating with the apertures, and compartments positioned below said floor, and adapted to contain gas at super-atmospheric pressure, said apertures opening into said compartments.

6. A sluice box as claimed in claim 5 in which there are provided liquid seal outlets, for each of said compartments.

7. A sluice box as claimed in claim 5 in which each compartment is provided with a wall positioned to form an extension of the downstream side of each corresponding aperture.

8. A sluice box as claimed in claim 5 in which a liquid outlet is provided for each compartment said outlet adapted to control the level of liquid in said compartments, and means for injecting air into said compartments.

9. A sluice box comprising a floor, discharge apertures spaced at intervals along the length of said floor, means for maintaining the outlets of said apertures at a gas pressure higher than the ambient pressure in the upper part of the sluice box, said floor being in the shape of adjacent parallel channels extending parallel to the length of said floor and communicating with the apertures, compartments positioned below said floor, and adapted to contain gas at super-atmospheric pressure, said apertures opening into said compartments, additional apertures in the floor of the sluice box, and conduits connected for supplying fluid under pressure to said additional apertures.

10. A sluice box comprising a floor, discharge apertures spaced at intervals along the length of said floor, the downstream side of each aperture being extended downwardly below said floor, liquid seals at the ends of the floor, a substantially airtight closure for the top of the sluice box, and means for maintaining the upper portion of the latter at sub-atmospheric pressure.

References Cited in the file of this patent

UNITED STATES PATENTS

| | | |
|---|---|---|
| 1,135,754 | Bell | Apr. 13, 1915 |
| 1,477,955 | Henry | Dec. 18, 1923 |
| 1,647,310 | Richardson | Nov. 1, 1927 |
| 1,910,386 | Garrett | May 23, 1933 |
| 1,961,666 | Hoyois | June 5, 1934 |
| 2,014,249 | Fletcher | Sept. 10, 1935 |
| 2,236,441 | Hardy | Mar. 25, 1941 |
| 2,275,849 | Fraser | Mar. 10, 1942 |
| 2,391,029 | Minichello | Dec. 18, 1945 |
| 2,426,337 | Bird | Aug. 26, 1947 |
| 2,449,582 | Brusset | Sept. 21, 1948 |